United States Patent [19]

Frank

[11] Patent Number: 5,399,984
[45] Date of Patent: Mar. 21, 1995

[54] DIGITAL FREQUENCY GENERATION DEVICE

[75] Inventor: Bernhard Frank, Philippsburg, Germany

[73] Assignee: Bruker Medizintechnik GmbH, Germany

[21] Appl. No.: 25,288

[22] Filed: Mar. 2, 1993

[30] Foreign Application Priority Data

Mar. 6, 1992 [DE] Germany .................. 42 07 045.7

[51] Int. Cl.⁶ .......................................... H03B 19/00
[52] U.S. Cl. ..................................... 327/107; 331/49; 327/113; 327/141; 327/233
[58] Field of Search ............... 307/269, 510, 511, 520, 307/522, 529, 243, 262; 328/14, 63, 104, 154, 137; 331/49

[56] References Cited

U.S. PATENT DOCUMENTS

| | | | |
|---|---|---|---|
| 3,708,686 | 1/1973 | Butler, Jr. et al. .................... | 331/49 |
| 3,986,136 | 10/1976 | Hurlburt ............................... | 331/49 |
| 4,121,172 | 10/1978 | Garde . | |
| 4,659,999 | 4/1987 | Motoyama et al. . | |
| 5,084,681 | 1/1992 | Kovalick et al. ..................... | 328/14 |
| 5,122,677 | 6/1992 | Sato ...................................... | 307/511 |
| 5,136,180 | 8/1992 | Caviasca et al. ..................... | 328/104 |
| 5,159,278 | 10/1992 | Mattison .............................. | 328/104 |
| 5,179,348 | 1/1993 | Thompson ............................ | 328/14 |
| 5,270,669 | 12/1993 | Jokura .................................. | 331/49 |

FOREIGN PATENT DOCUMENTS

| | | | |
|---|---|---|---|
| 0112322 | 6/1984 | Japan ................................... | 331/49 |
| 0247126 | 11/1986 | Japan ................................... | 331/49 |

Primary Examiner—Timothy P. Callahan
Assistant Examiner—Terry D. Cunningham
Attorney, Agent, or Firm—Cesari and McKenna

[57] ABSTRACT

A digital frequency generating device is comprised of a first digital frequency generator which generates a first output signal at a first frequency and a second digital frequency generator which generates a second output signal at a second frequency independent of the first frequency. Both the first and the second frequency generators run continuously and either can be connected to the generating device output by means of a multiplexer. Apparatus is provided to synchronize the two generators so that a continuous phase transition is maintained when the generating device output switches from the first output signal to the second output signal. This arrangement allows the device output to be shifted from a first frequency to a second frequency and then return to the first frequency output while maintaining the phase position of the first frequency output and is particularly useful in nuclear magnetic resonance applications.

9 Claims, 3 Drawing Sheets

DIGITAL FREQUENCY GENERATION DEVICE

BACKGROUND OF THE INVENTION

The invention relates to a digital frequency generation device with an output stage and a first digital frequency generator, which generates at its output a first signal with a selectable first frequency $f_1$ and with a first phase position $\varphi_1$, which can be connected to the output stage of the frequency generating device in such a manner that at the output of the output stage a signal with the first frequency $f_1$ and the first phase position $\varphi_1$ is present, wherein at any time the first frequency $f_1$ can be switched over at the output of the output stage to a selectable second frequency $f_2$ with a phase continuation which is defined with respect to the first frequency $f_1$, in particular a continuous phase continuation.

A frequency generating device of this type is known for example from the manual "PTS Frequency Synthesizers" by the company Programmed Test Sources Inc. of 1988.

Digital frequency generating devices (frequency synthesizers) in general have the task to provide at their output frequency signals with a selectable frequency of high accuracy and stability. As a rule these are signals with a sine-shaped course of amplitude. Typical applications for such frequency signals are in the area of communications technology, the generation and processing of radar pulses and radar echos, respectively, automatic test systems for the supervision of the stability of time-constant or time-variant quantities and the vast area of the generation and analysis of frequency spectra.

The switching of the output signal of a digital frequency generating device according to the prior art from a first selected frequency to a second, is performed normally in a phase-continuous manner, i.e. at the point in time of switching, the amplitude and phase of the output signal with the first frequency $f_1$ coincide with amplitude and phase of the output signal at the second frequency $f_2$. If the output signal is switched back from the frequency $f_2$ to the frequency $f_1$, the output signal is also continued in a phase-continuous manner with the actual amplitude and phase value of the $f_2$-signal at the point in time of switching back to the frequency $f_1$. Since the original phase of the first output signal with the frequency $f_1$ is not stored and when switching back from the frequency $f_2$ to the frequency $f_1$, the phase present at the moment is continued, the phase coherence with the original signal is lost in principle in the case of multiple frequency switchings with a conventional digital frequency generating device.

In the manual mentioned above the principle possibility of a phase coherent switching is indicated, in which for example after a switching sequence of the output signal from an original frequency $f_1$ to a further frequency $f_2$ and again back to the frequency $f_1$ the new signal with the frequency $f_1$ is continued in a phase-coherent manner to the original signal with the frequency $f_1$, however, this possibility is provided only for switchings of frequency steps of more than 1 MHz, wherein the corresponding frequency shifts between the selected frequencies are generated not with digital, but directly-analogue technology by mixing fixed phase-rigid oscillator frequencies from a system clock.

In the case of many technical applications, in particular in applications on the field of nuclear magnetic resonance it is desired when switching back from the second selected frequency to the first frequency to obtain an output signal, which has the same phase position as the original signal would have at the first frequency at the point in time of switching back, if no switching had occured in the meantime, but wherein the frequency shifts when switching are far below the 1 MHz area such that the application of the described direct-analog mixing technique is not applicable.

SUMMARY OF THE INVENTION

It is thus an object of the present invention to provide a digital frequency generating device by means of which multiple phase-coherent frequency switchings of the output signal are possible.

This object is achieved according to the invention in that the frequency generating device comprises of a second digital frequency generator which generates at its output a second signal with the selectable second frequency $f_2$, in that the output of the second digital frequency generator can be connected, alternatively to the output of the first digital frequency generator, to the output stage of the frequency generating device, whereas the first digital frequency generator continues to run independently thereof, and in that subsequently again the output of the first digital frequency generator can be connected, alternatively to the output of the second digital frequency generator, to the output stage of the frequency generating device.

Such an arrangement of two digital frequency generators of this type allows a phase-continuous switching from a first to a second selectable frequency as well as a phase-coherent switching back from the second to the first frequency. The first digital frequency generator acts in this connection as "master" and runs permanently, whereas the second digital frequency generator provides from case to case an output signal with a selectable frequency which is different to the one of the first digital frequency generator and with a phase which can be switched continuously to the last phase value of the signal from the first digital frequency generator.

In a preferred embodiment of the frequency generating device according to the invention the first as well as the second digital frequency generators are integrated on one single FPGA (field programmable gate array). In this way the frequency generating device becomes particularly inexpensive and compact and the FPGA which is needed anyway is used to an optimum degree. By using only one instead of two construction parts the safety against failure of the device is also increased.

In a further preferred embodiment a multiplexer is provided between the outputs of the two digital frequency generators and the output stage of the frequency generating device, which acts as a change-over switch, such that only one signal is passed on to the output stage. Thus, merely one output signal in each case is present at the output stage of the frequency generating device such that accordingly only one single signal terminal is necessary.

Preferred is also an embodiment in which the phase continuation can be freely selected when switching over from the first frequency $f_1$ to the second frequency $f_2$. This can be performed in the easiest way by adding a settable phase-offset-value to the signal generated in the second digital frequency generator.

Particularly suitable for NMR applications is an embodiment of the frequency generating device according to the invention, in which the frequencies $f_1$, $f_2$ are in the range of between 10 MHz to several 100 MHz. Preferably the frequency shift comprises values of $\Delta f = |f_1 - f_2| < 100$ kHz, in particular $< 10$ kHz.

In a preferred embodiment the first digital frequency generator comprises a phase incrementation element, an adding element and a phase register, wherein the phase incrementation element causes, in the cycle of a system clock, the adding element to increase the phase value $\varphi_1$, which the phase register sends to the output of the first digital frequency generator, by a fixed phase increment $\Delta\varphi_1$; the second digital frequency generator comprises a phase incrementation element, an adding element, a multiplexer and a phase register, wherein the phase incrementation element causes, in the cycle of a system clock, the adding element to increase the phase value $\varphi_2$, which the phase register sends to the output of the second digital frequency generator, by a fixed phase increment $\Delta\varphi_2$, if the multiplexer connects the output of the adding element to the input of the phase register, or wherein the multiplexer, caused by a signal from a control element, connects the output of the adding element of the first digital frequency generator to the input of the phase register of the second digital frequency generator; effected by the control element, a further multiplexer finally connects alternatively the output of the first digital frequency generator or the output of the second digital frequency generator to the input of the output stage of the frequency generating device.

Preferred is a further development of this embodiment in which the second digital frequency generator is additionally provided with a phase shifting element which is cycled by the system clock as well as with a further adding element, wherein an input of the further adding element is connected to the output of the phase register and a further input of the further adding element is connected to the output of the phase shifting element at which a selectable phase-offset-signal is present, and wherein the output of the further adding element is the output of the second digital frequency generator.

In a further preferred embodiment of the frequency generating device according to the invention the output stage comprises a storage element with a digital sine table which assigns to the digital phase signal which is present at the input of the output stage the associated digital amplitude value of a normalized digitalized sine curve, wherein the amplitude value can be converted to an analog frequency signal in a digital-to-analog converter (DAC) following the digital sine table.

Preferred is finally a further development of this embodiment in which the digital-to-analog converter is following a low-pass filter the output of which being the output of the output stage. This low-pass filter serves for smoothing the step-shaped quasi analog output signals such that finally a sine signal is at the output of the output stage.

A particularly important field of application of the above-described digital frequency generating device according to the invention is the nuclear magnetic resonance (NMR) technology. Since with the conventional frequency generating devices according to the prior art, no phase-coherent but merely a phase-continuous frequency switching was possible, in a measuring sequence in which more than one frequency was required for excitation or detection, with given switching times it was possible only in exactly defined frequency steps to switch over to the different frequencies in order to guarantee the phase coherence required in many NMR-experiments.

Thus it is also an object of the invention to provide an NMR method in which coherent nuclear magnetic resonance excitations with different excitation frequencies at any point in time in one sequence are possible.

Therefore, the invention relates also to a method for operating an NMR apparatus wherein a sequence of radio frequency (RF) pulses is irradiated into a measuring volume, which sequence contains at least one excitation pulse with a frequency $f_A$ and a phase $\varphi_A$ for the excitation of selected nuclear spins of a sample located in the measuring volume, and wherein at least one further RF pulse, possibly a reference pulse with a frequency $f_R$ and a phase $\varphi_R$ is used and again an RF pulse of the frequency $f_A$ and a phase $\varphi_A$, which is defined with respect to $\varphi_A$.

The above object is achieved within the scope of the present invention in that alternatively the excitation pulse or the further RF pulse is taken from the output of a digital frequency generating device which is in particular formed in the above-mentioned manner, wherein a phase-continuous switching from the excitation frequency to the further RF frequency and a phase-coherent switching from the further RF frequency back to the excitation frequency is performed. Owing to the possibility of phase-coherent back-switching to the reference frequency at any time, the phase relation with the first RF pulse of the frequency $f_A$ remains the same at a further excitation with the frequency $f_A$ despite frequency switchings which occured in the meantime.

An application of the above-mentioned method in NMR imaging also falls within the scope of the invention. Particularly preferred in this connection is the use of a multi-slice-RARE pulse sequence as NMR imaging sequence.

In the following the invention is further described and explained in more detail with reference to the embodiments shown in the drawing. The features given in the description and in the drawing may be applied in other embodiments of the invention individually, on their own or in any combination with one another.

DESCRIPTION OF THE PREFERRED EMBODIMENTS

The usual frequency generating devices work in the radio frequency (RF) range and generate very accurate highly stable frequency signals which can be switched rapidly. They can be programmed within a specified frequency range either manually or by remote control to virtually any output frequency. This output frequency is as accurate and stable as the built-in frequency standard, which consists usually of a crystal oscillator, or as an external precision standard which can be connected to the frequency generator instead of its own internal standard. If particularly high stabilities are required, frequently atomic or molecular standards are used.

In order to generate an output frequency from a reference standard, modern frequency synthesizers use three different technologies individually or in combination, i.e. the direct-analog, the indirect-digital and the direct-digital frequency generation. The invention refers merely to a frequency generating device with direct-digital technology.

Figure 1:
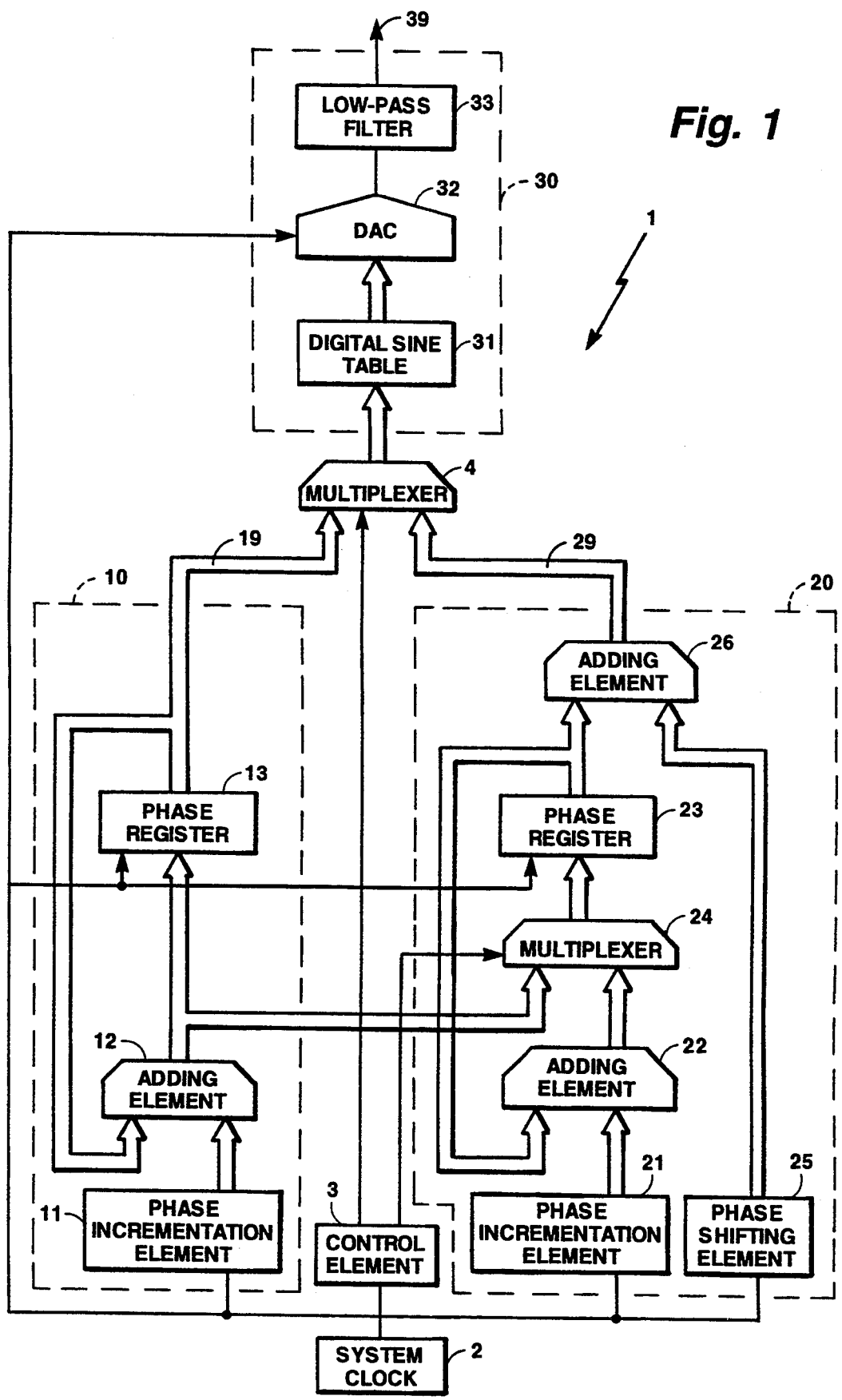
FIG. 1 shows a schematic block diagram of an embodiment of the digital frequency generating device according to the invention.

FIG. 1 shows schematically a digital frequency generating device 1 according to the invention with a first digital frequency generator 10, a second digital frequency generator 20 and an output stage 30. The first digital frequency generator 10 consists of a phase incrementation element 11, an adding element 12 and a phase register 13. The phase incrementation element 11 contains a pre-selectable fixed phase increment $\Delta_1$, which is added in the cycle of a system clock 2 in the adding element 12 to a phase value which is in the phase register 13. The sum from the addition of these two values is passed on from the adder 12 to the phase register 13, which provides this sum at the output 19 of the first frequency generator 10 as a first phase signal.

The second digital frequency generator 20 comprises a phase incrementation element 21, an adding element 22, a multiplexer 24 and a phase register 23. Like with the first digital frequency generator 10, the adding element 22 adds the phase value in the phase register 23 to the pre-selectable phase increment $\Delta_2$ provided by the phase incrementation element. The sum from this addition is put into the multiplexer 24. The output value from the adding element 12 of the first digital frequency generator 10 is put in the other input of the mulitplexer 24. The multiplexer 24, controlled by a control element 3, passes either the phase value from the adding element 22 or the phase value from the adding element 12 on to the input of the phase register 23. The phase register 23 again passes the momentarily present phase value in the cycle of the system clock 2 on to a further adding element 26 in which a selectable phase-offset value from a phase shifting element 25 is added to the phase value from the phase register 23. The sum from this addition is present at the output 29 of the second digital frequency generator 20 as a second phase signal.

The signals of the outputs 19 and 29 of the first digital frequency generator 10 and of the second digital frequency generator 20 are supplied to the inputs of a multiplexer 4 which passes on alternatively either the one or the other of the two phase signals to the input of the output stage 30 owing to a control signal from the control element 3.

The output stage 30 again consists in the shown embodiment of a storage element which contains a digital sine table 31, of a digital-to-analog converter (DAC) 32 as well as of a low-pass filter 33. In the sine table 31 to the present phase signal from the multiplexer 4 the associated digital amplitude value of a normalized digital sine curve is assigned and passed on to the following digital analog converter 32. In the cycle of the system clock 2 the digital analog converter 32 passes the amplitude signal which is present in each case and corresponds to the phase value present in each case to the low-pass filter 33 where a time smoothing of the step-curve shaped amplitude values from the digital-to-analog converter 32 is performed such that at the output 39 of the output stage 30 finally a sine-shaped analog frequency signal can be tapped.

When operating the frequency generating device 1, firstly a first frequency $f_1$ is selected which is generated in the first digital frequency generator 10 and is passed on via the multiplexer 4 to the output stage 30, at the output 39 of which a corresponding analog sine-shaped frequency signal can be tapped. The magnitude of the frequency $f_1$ is determined via the selectable input value $\Delta_1$ in the phase incrementation element 11 in connection with the reference frequency from the system clock 2.

If now, by means of the control element 3, switching to a second selectable frequency $f_2$ from the second digital frequency generator 20 is performed, the output signal with the second frequency $f_2$ can start either at any presettable phase-offset value from the phase shifting element 25, if the phase signal from the phase register 23 was previously set to zero, under the precondition that, owing to a corresponding signal from the control element 3, the multiplexer 24 passes the phase signal from the adding element 22 on to the phase register 23. In this case, at the output 29 of the second digital frequency generator 20, a second signal is present at the input of the multiplexer 4, which is completely independent of the preceding first signal from the first digital frequency generator 10 with respect to frequency as well as to phase position and is passed on by the multiplexer 4 to the output stage 30 owing to a control pulse from the control element 3.

If, however, the control element 3 causes the multiplexer 24 in the first "active" cycle of the second digital frequency generator 20 to pass on as a first phase signal the signal from the adding element 12 to the phase register 23, the adding element 26 passes the phase signal which is present as the latest signal at the adding element 12 of the first digital frequency generator 10 and which is increased by the phase-offset value from the phase shifting element 25, on to the output 29 of the second digital frequency generator 20. If the phase-offset value in the phase shifting element 25 was selected as zero, thus in the moment of switching to the second digital frequency generator 20, the latter's output 29 provides a phase signal which is equal to the actual phase signal at the output 19 of the first digital frequency generator 10. In this way the phase-continuous connection of the second signal to the first signal is given. In the next cyclic step from the system clock 2, the control element 3 will switch the multiplexer 24 in such a way that only the phase values from the adding element 22 are passed on to the phase register 23. In the case of the second cycle there is consequently a phase signal in the phase register 23, which corresponds to the last phase value from the adding element 12 of the first digital frequency generator 10 increased by the phase increment $\Delta_2$ from the phase incrementation element 21. This value is increased in the following with every system cycle by the phase increment $\Delta_2$, in each case, which is different to the phase increment $\Delta_1$, such that the phase signal at the output 29 of the second digital frequency generator 20 generates a frequency signal with the second frequency $f_2$ at the output 39 starting from the point in time of switching after running through the output stage 30.

When switching back to the first frequency $f_1$ the multiplexer 4 is caused by the control element 3 to pass on again the phase signal from the output 19 of the first digital frequency generator 10 to the output stage 30 instead of the phase signal from the output 29 of the second digital frequency generator 20. Since the first digital frequency generator 10 continued in the meantime independently of the second digital frequency generator 20, thus the switching back to the frequency signal with the first frequency $f_1$ is performed in a phase-coherent way to the original frequency signal with the frequency $f_1$.

Figure 2:
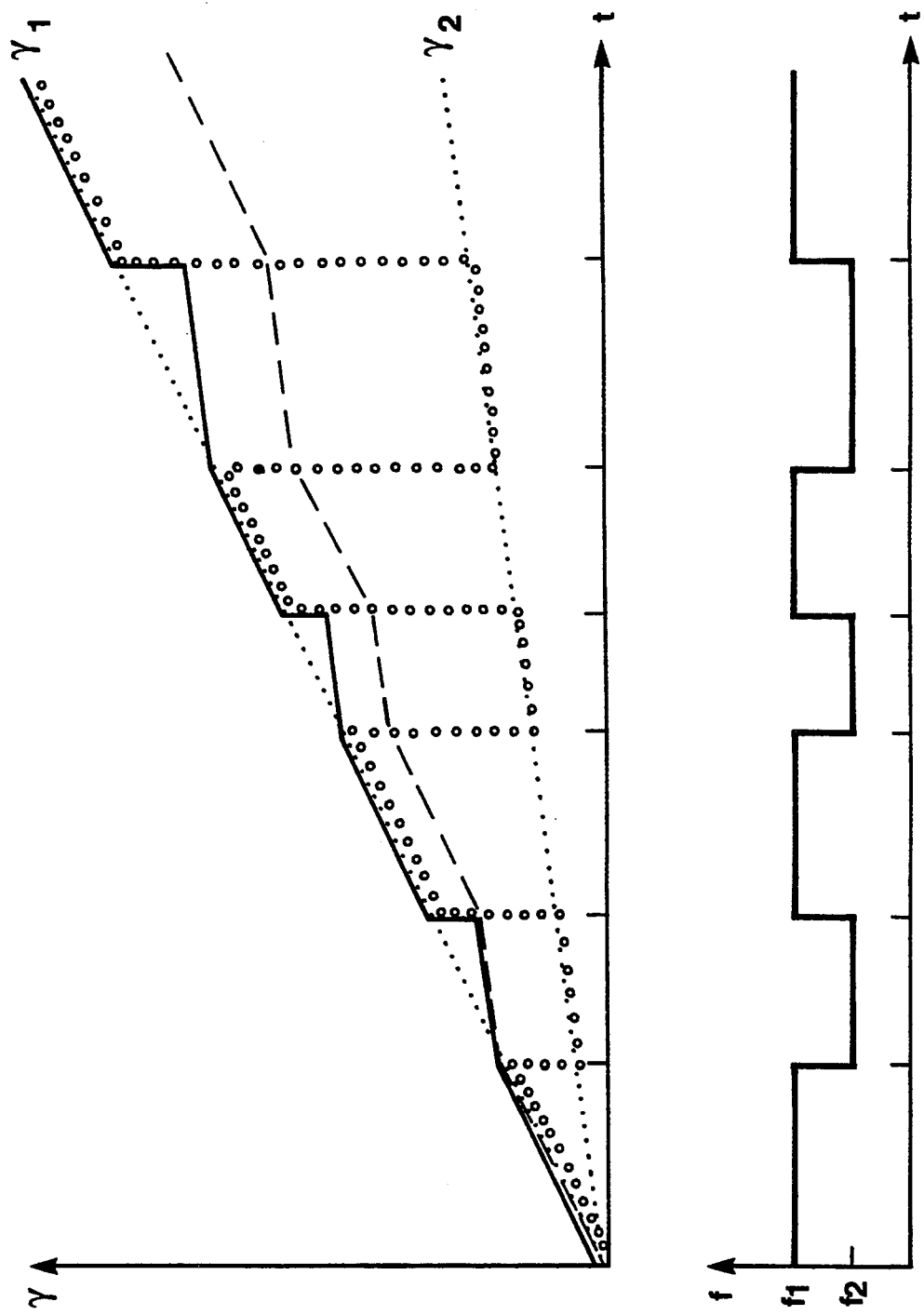
FIG. 2 shows a time diagram of the phase development with phase-continuous frequency switching according to prior art and with phase-coherent frequency switching, respectively, according to the invention.

The above explanations are illustrated in FIG. 2, where in the lower half of the Figure the time switching of the frequency f of the output signal between the two frequencies $f_1$ and $f_2$ is shown. The upper half of the Figure shows in dots, in each case, the undisturbed time developments of the associated phases $\phi_1$ and $\phi_2$, respectively. By means of a broken line the phase course is shown in the case of phase-continuous switchings between the frequencies $f_1$ and $f_2$, as it is performed according to prior art. As explained above, the digital frequency generating device according to the invention gives the possibility for phase-coherent switchings between the frequencies $f_1$ and $f_2$ in each case. The associated curve in the phase diagram of FIG. 2 is pictured by means of little circles. The other option, namely a phase-continuous switching from the frequency $f_1$ to the frequency $f_2$ and a phase-coherent switching back from the frequency $f_2$ to the frequency $f_1$ is shown in the phase diagram with a solid line.

A main field of application for the possibility of phase-coherent frequency switching is nuclear magnetic resonance (NMR) technology. The frequencies which are applied there, are typically in the range of between 10 MHz and several 100 MHz. The frequency shift $\Delta f = |f_1 - f_2|$ when switching between two frequencies $f_1$ and $f_2$ is typically smaller than 10 kHz.

In the case of NMR experiments a sequence of RF pulses is irradiated into a measuring volume in which a sample is exposed to a strong homogeneous magnetic field $B_0$. An NMR measuring sequence of this type contains at least one excitation pulse with a frequency $f_A$ and a phase $\phi_A$ for the excitation of selected nuclear spins in the sample. In the case of slice selective excitation of the nuclear spins, additionally a magnetic gradient field, the so-called slice selection gradient $G_S$ is irradiated into the measuring volume which gradient field superimposed with the homogeneous magnetic basic field $B_0$ results in a magnetic field which is linearly varying in one spatial direction. If now an RF pulse with a frequency $f_R$ causes an excitation of the nuclear spins in a slice perpendicular to the direction of the linear slice selection gradient $G_S$, other excitation pulses with frequencies which are smaller than $f_R$ generate excitations in slices which are parallel thereto and are in front of the first-mentioned slice viewed in the direction of the gradient and excitation pulses with frequencies which are larger than $f_R$ generate excitations in parallel slices behind the first-mentioned layer. When selecting one slice the excitation frequencies at the two opposing ends may, with corresponding spatial expansion of the measuring volume, differ to a relatively high degree from the reference frequency $f_R$.

In this connection the problem is not really the generation of the different excitation frequencies, but rather the fact, that up to now the detection electronics has to be designed for the double or even quadruple band width, in order to be able to record the signals including the above-mentioned frequency shift. A consequence thereof is that correspondingly more data storage memory has to be provided. For this reason, according to the invention the signals which stem from the various slices are detected in an advantageous manner with the reference frequency $f_R$, which corresponds to the resonance frequency without gradient, such that the signals of all slices appear in the same, i.e. unshifted, frequency range. When switching back to the respective excitation frequency an unconditional phase coherence with the previous RF excitation pulses is necessary. This is ensured by using the above described frequency generating device according to the invention.

Figure 3:
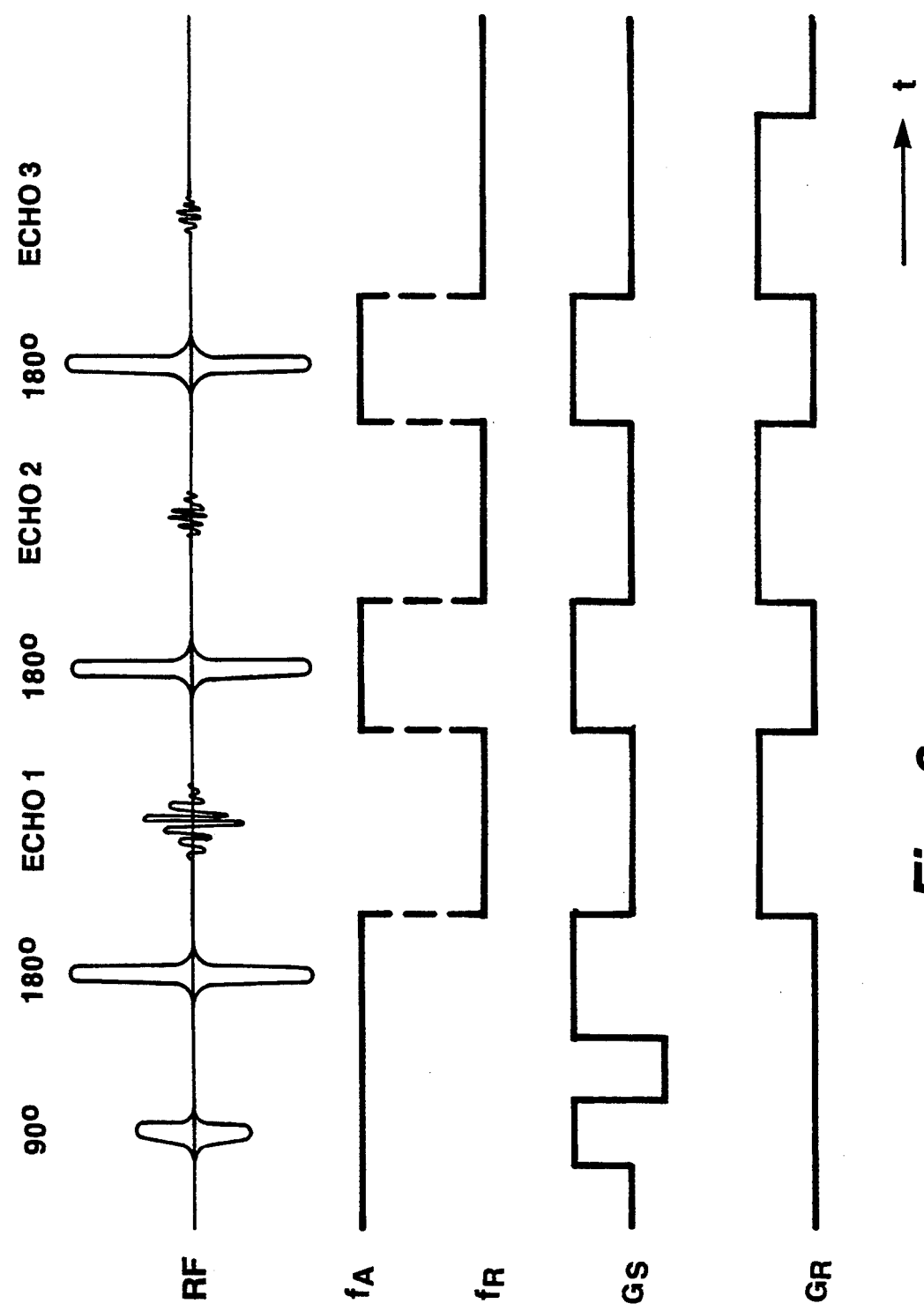
FIG. 3 shows a schematic time diagram of a RARE measuring sequence with excitation and echo pulses as well as frequency and gradient courses.

Finally, in FIG. 3 an application of the phase-coherent frequency switching according to the invention is explained in detail in the field of NMR Imaging technology. The uppermost line in the Figure named "RF" shows RF excitation pulses of a "RARE" sequence, wherein as a first excitation pulse schematically a so-called 90° pulse and as further excitation pulses 180° pulses are shown in each case. Between the 180° pulses there are the echo pulses which decrease with time in each case and are read out during the application of a readout gradient shown in the last line of FIG. 3 and being denoted $G_R$. For the duration of the RF pulses a slice selection gradient, denoted $G_S$ is applied in each case. The switching over between the excitation frequency $f_A$ and the reference frequency $f_R$ is shown in the second and third Figure line of FIG. 3. Of course the switching over from the reference frequency $f_R$ to the excitation frequency $f_A$ has to be performed in a phase-coherent manner in each case, whereas the switching over from the excitation frequency $f_A$ to the reference frequency $f_R$ may also be performed in a phase-continuous manner.

A further field of applications of a digital frequency generating device with phase-coherent frequency switching is the field of NMR spectroscopy.

I claim:

1. In an improved digital frequency generating device having an output stage and a first digital frequency generator, with an output, for generating a first signal having a selectable first frequency $f_1$ and a first phase $\phi_1$, the first signal being connectable to the output stage for generating an output stage signal having the first frequency $f_1$ and the first phase $\phi_1$, the generating device being adapted to, at any time, switch the first frequency $f_1$ of the output stage signal to a selectable second frequency $f_2$ having a second phase $\phi_2$ which is defined with respect to the first frequency $f_1$, the improvement comprising:

a system clock;

a second digital frequency generator, having an output and responsive to the system clock for generating a second signal having the second frequency $f_2$ and the second phase $\phi_2$, and a first multiplexer to connect the output from one of the first and second digital frequency generators to the output stage, whereby the first frequency generator is responsive to the system clock and continues to run independently of the second digital frequency generator, wherein the first digital frequency generator comprises:

a first phase incrementation element, a first phase register, and a first adding element connected between the first phase incrementation element and the first phase register, whereby, in phase with the system clock, the first phase register repeatedly increments the phase first $\phi_1$ sent to the output of the first digital frequency generator by a fixed phase increment $\Delta\phi_1$, and wherein the second digital frequency generator comprises:

a second phase register, a second adding element, a second multiplexer connected between the first adding element and the second phase register as well as between the second adding element and the second phase register, and a second phase incrementation element connected to the second adding element, whereby, in phase with the system clock, the second multiplexer, in response to signal from a control element connects of the second adding element to the second phase register, whereby the second phase register repeatedly increments the second phase $\phi_2$ sent to the output of the second digital frequency generator by a fixed phase increment $\Delta\phi_2$ or connects the first adding element to the second phase register, and the first multiplexer is connected between the outputs of the first and second digital frequency generators and the output stage as well as to the control element, whereby, in response to said signal from the control element, the first multiplexer connects one of the output of the first digital frequency generator and the output of the second digital frequency generator to the output stage.

2. The digital frequency generating device of claim 1, wherein the first and the second digital frequency generators are integrated on one single FPGA chip.

3. The digital frequency generating device of claim 1, wherein the second phase is selectable when switching over from the first frequency $f_1$ to the second frequency $f_2$.

4. The digital frequency generating device of claim 1, wherein the frequencies $f_1$, $f_2$ are in excess of 10 MHz.

5. The digital frequency generating device of claim 1, wherein a frequency shift $\Delta f = |f_1 - f_2| < 100$ kHz.

6. The digital frequency generating device of claim 1, wherein the second digital frequency generator further comprises a phase shift element, having a selectable phase offset output signal and cycled by the system clock, and a third adding element having a first input connected to an output of the second phase register and a second input connected to the output of the phase shift element, whereby an output of the third adding element forms the output of the second digital frequency generator.

7. The digital frequency generating device of claim 1, wherein the output stage comprises a storage element having a digital sine table to assign a digital amplitude value of a normalized digitized sine curve to a digital phase signal present at an input of the output stage, the output stage further comprising a digital-to-analog converter connected to an output of the digital sine table to convert the amplitude value to an analog frequency signal.

8. The digital frequency generating device according to claim 7, wherein the output stage comprises a low-pass filter connected to an output of the digital-to-analog converter with an output to generate the output stage signal.

9. The digital frequency generating device of claim 1, wherein a frequency shift $\Delta f = |f_1 - f_2| < 10$ kHz.

* * * * *